Patented Mar. 9, 1954

2,671,812

UNITED STATES PATENT OFFICE 2,671,812

REACTION OF OZONIDES WITH GRIGNARD REAGENTS

Joseph W. Sparks, Hammond, and James O. Knobloch, Hobart, Ind., assignors to Standard Oil Company, Chicago, Ill., a corporation of Indiana No Drawing. Application October 30, 1951, Serial No. 253,969

10 Claims. (Cl. 260—618)

This invention relates to the preparation of organic oxygenated compounds. More particularly, it relates to the conversion of olefins into alcohols and aldehydes. In a specific embodiment, a secondary alcohol is prepared by reacting an olefin ozonide with a Grignard reagent and hydrolyzing the resulting reaction product.

Olefins are known to react readily with ozone to form a class of compounds known as "ozonides," the structure of which has never been satisfactorily elucidated. Ozonides are unstable compounds of great reactivity, and have heretofore been converted by various means into a wide variety of derivatives.

We have now discovered that olefin ozonides react readily with Grignard reagents to form an intermediate composition from which primary alcohols, secondary alcohols, and aldehydes can be obtained by hydrolysis. In our new process, a solution of an olefin in an organic solvent is contacted with ozone, the resulting olefin ozonide is commingled with an ethereal solution of a Grignard reagent, and the resulting mixture is subjected to temperature and pressure conditions suitable for effecting chemical combination of the ozonide and the Grignard reagent. The reaction product is hydrolyzed and acidified, and the layers are separated. The aqueous layer is extracted with ether or other organic solvent immiscible with water, and the extracts and the primary ether layer from the hydrolysis mixture are distilled to recover the desired products. The identity of the products depends, of course, upon the specific ozonide and Grignard reagent utilized in carrying out the process.

One object of our invention is to convert olefinic compounds into useful oxygen-containing products. Another object is to convert olefin ozonides into alcohols. A further object is to convert olefin ozonides into secondary alcohols. An additional object is to convert olefins into primary and secondary alcohols by means of a unitary combination process. A subsidiary object is to prepare certain individual alcohols and types thereof by means of an improved and simplified technique. Other objects of our invention will be apparent from the present description thereof.

Our process is applicable broadly, with minor limitations, to the treatment of ozonides of organic compounds containing an olefinic linkage. Such compounds have the structure $$\begin{array}{c} Q \\ \diagdown \\ Q' \end{array} C = C \begin{array}{c} R \\ \diagup \\ R' \end{array}$$

where Q, Q', R, and R' represent hydrogen or organic radicals. It is preferred that the organic radicals be free from active hydrogen atoms, since they would otherwise react with the Grignard reagent, thereby reducing the quantity of Grignard reagent available for the desired reaction while simultaneously altering and complicating the ultimate reaction product. The organic radicals can be, for example, hydrocarbon radicals, suitably n-alkyl, branched alkyl, or carbocyclic groups such as phenyl, naphthyl, tolyl, xylyl, cyclohexyl, cyclopentyl, or the like.

Suitable Grignard reagents have the structure

R" MgX where X is a halogen and R" is an organic radical free from functional groups which tend to react with ozonides. R" can be, for example, a hydrocarbon radical, suitably methyl, ethyl, n-hexyl, cetyl, or other normal or branched alkyl; phenyl, benzyl, cyclohexyl, or the like.

Our process can also be carried out with special types of Grignard reagents, formed indirectly by reacting low-molecular-weight Grignard reagents of the conventional type with compounds containing an active hydrogen, such as mercaptans, alcohols, amines, and the like. The following are illustrative:

$R_2NH + C_2H_5MgBr \longrightarrow R_2NMgBr + C_2H_6$

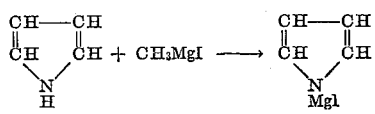

$ROH + C_3H_7MgI \longrightarrow ROMgI + C_3H_8$ $RSH + C_4H_9MgBr \longrightarrow RSMgBr + C_4H_{10}$ Novel products of interesting and useful properties are obtainable in this manner.

The reaction of a Grignard reagent with an ozonide in our process cleaves the ozonide, and hydrolysis of the resulting intermediate compositions produces two major end-products,

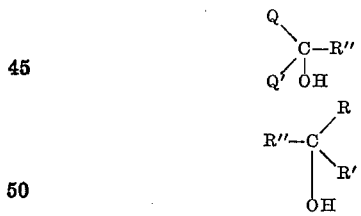

where the various symbols are as defined above. Thus, it will be apparent that two primary alcohols are obtained when our charging-stock olefin is ethylene; and that primary, secondary, and tertiary alcohols are obtainable from other olefins, depending upon their specific structure. In addition, we have observed that minor quantities of aldehydes are obtained as by-products thereof when the molar ratio of Grignard reagent to ozonide is less than about 3:1.

The preparation of Grignard reagents is well known in the art, as exemplified by Fuson and Snyder ("Organic Chemistry," New York: John Wiley, 1942, pages 259 and 260). In a typical case, an alkyl halide and magnesium in equimolar proportions are agitated at reflux temperature in anhydrous ethyl ether, optionally with a crystal of iodine added as a catalyst, until the magnesium is dissolved. It is essential that anhydrous conditions be maintained and that access of air to the reaction mixture be avoided. Ethyl ether is the preferred reaction solvent, although other solvents are frequently employed, such as isopropyl ether, n-butyl ether, trimethylamine, triethylamine, and the like. Substantially any monohalogenated organic compound can be converted into a Grignard reagent, with the exception of those compounds which contain functional groups that are attacked by the reagent. The most suitable compounds for conversion into Grignard reagents are the alkyl and aryl bromides and iodides.

The preparation of olefinic ozonides is likewise well known in the art, and is described, for example, by Long ("The Ozonization Reaction," Chemical Reviews, 27 (1940), pages 450 and 451). The preparation is readily effected by contacting a charging stock containing an olefin with a stream of air or oxygen which has been treated in a conventional manner to produce ozone therein, suitably but not necessarily in a concentration between about 2 and 8 percent. The ozone is absorbed rapidly and completely so long as any olefinic compounds remain unreacted in the reaction vessel. The extent of the reaction is conveniently determined by passing the depleted gases through a potassium iodide-starch indicator solution, the treatment with ozone being stopped as soon as the presence of ozone in the depleted gases is evidenced by the appearance of blue color in the indicator solution. Owing to the instability of olefin ozonides, it is inadvisable to treat an undiluted olefin, but rather to employ a dilute solution of the olefin in an organic solvent which is inert to ozone and to the other materials subsequently to be employed in the process. For this purpose, a light hydrocarbon such as pentane, hexane, heptane, or the like, a halogenated hydrocarbon such as chloroform, methylene chloride, carbon tetrachloride, Freon, or the like, or a tertiary amine such as trimethylamine, triethylamine, or the like is suitable. Ethers cannot be used, since they form unstable derivatives in the presence of ozone. Ethyl ether, for example, explodes when treated with ozone. Inasmuch as water decomposes both ozonides and Grignard reagents, the ozonide should be prepared and maintained under anhydrous conditions.

From the considerations set forth above, it will be apparent that a minimum molar ratio of Grignard reagent to ozonide of about 2:1 should be employed in our process in order to convert substantially all of the ozonide. In practice, we ordinarily employ at least a small excess of Grignard reagent, and we prefer to use around 3 moles per mole of ozonide. Larger and smaller proportions may of course be used, depending upon the charging stocks, the relative conversions desired, and the specific products desired. For example, an aldehyde is formed from the shorter olefin fragment when less than 3 moles of Grignard reagent are used per mole of ozonide.

The reaction of ozonides with Grignard reagents is satisfactorily carried out at ordinary temperatures around 20 to 40° C., but somewhat higher and lower temperatures can also be used, for example between about 0 and 60° C. The pressure employed is not critical, atmospheric or autogenous pressures being suitable. Hydrolysis of the ozonide-Grignard reagent primary reaction product is preferably effected at temperatures below about 20° C., suitably with ice or ice water, and preferably with the addition of a strong acid in an amount equivalent to the magnesium present in the mixture. Hydrochloric, sulfuric, phosphoric acids, and the like are suitable.

The hydrolysis reaction product can be processed in a conventional manner to recover the alcohols and other constituents contained therein. The alcohols are contained largely in the organic phase of the hydrolyzed reaction product, and can be recovered therefrom by fractional distillation. The alcohols remaining in the aqueous phase can conveniently be recovered therefrom by extraction with an immiscible organic solvent or simply by fractional distillation. Many equivalent techniques will be evident to those skilled in the art.

Our invention is illustrated by the following specific examples.

*Example I*

The ozonide of 1-tetradecene was added to ethylmagnesium bromide, and on hydrolysis of the reaction product, 3-pentadecanol was obtained.

A solution of 9.8 grams (0.05 mole) of 1-tetradecene in 100 milliliters of pentane was ozonized, and the pentane was removed by distillation under vacuum and replaced with 100 milliliters of anhydrous diethyl ether. An ethereal solution of ethylmagnesium bromide was prepared by adding 31.5 grams (0.29 mole) of ethyl bromide dropwise to 6.3 grams (0.25 gram-atom) of magnesium metal turnings and 100 milliliters of anhydrous diethyl ether and refluxing for 2.5 hours. The ozonide solution was added dropwise with agitation to the ethereal solution of ethylmagnesium bromide over a period of 80 minutes, and the resulting mixture was refluxed for 17.5 hours. The reaction product was poured on ice and acidified with a mixture of 20 milliliters of aqueous 96 percent sulfuric acid and 20 milliliters of water. The ether layer was separated and withdrawn, and the aqueous layer was shaken twice with 200-milliliter portions of diethyl ether. All of the ether layers were combined and dried over calcium chloride. The calcium chloride was filtered off, and the ether was evaporated in a stream of dry air. The residue weighed 9.8 grams and melted slightly below room temperature.

Nine grams of the residue were fractionally distilled under vacuum, and the following fractions were obtained:

| Fraction | Weight, g. | Boiling Point, °C. | Pressure, mm. | $n_D^{20}$ | $d_4^{25}$ |
|---|---|---|---|---|---|
| 1 | 0.71 | 49–89 | 1.7–1.3 | 1.4368 | |
| 2 | 2.59 | 89–95 | 1.3–1.2 | 1.4442 | 0.824 |
| 3 | 4.01 | 95–102 | 1.0 | 1.4457 | 0.829 |
| 4 | 0.39 | | ca. 0.8 | 1.4472 | |
| Residue | 0.8 | | | | |

Fraction 3, after being recrystallized five times from ethyl acetate, melted at 33-34° C. A sample of the recrystallized material was dried over phosphorus pentoxide at 1 mm. Hg for 16 hours, and was analyzed for carbon and hydrogen. Calculated for $C_{15}H_{32}O$: C, 78.9%; H, 14.1%. Found: C, 79.3%, H, 14.3%. Infra-red examination indicated the presence of a secondary alcohol, and the absence of primary and tertiary alcohols and carbonyl groups. The density of fraction 3, corrected to 20° C., was 0.832. The molar refraction of fraction 3, assuming it to be 3-pentadecanol, was 73.17, compared with a calculated value for 3-pentadecanol of 73.00. From these data, it appears that fraction 3 was 3-pentadecanol.

*Example II*

The ozonides of a mixture of 1-octene and 2-octene were added to ethylmagnesium bromide, and on hydrolysis of the reaction product, 3-octanol and 3-nonanol were obtained.

A solution of 0.15 gram-mole of a mixture of 1-octene and 2-octene in 150 milliliters of methylene chloride was ozonized, and the methylene chloride was thereafter removed under vacuum and replaced with 100 milliliters of diethyl ether.

Ethylmagnesium bromide was prepared by adding 0.33 gram-mole of ethyl bromide dropwise to 0.30 gram-atom of magnesium turnings in 150 milliliters of diethyl ether and refluxing the mixture for three hours.

The ozonized solution was added dropwise to the Grignard reagent over a 3.5-hour period (as fast as the heat of reaction was removed by refluxing ether), and the reaction mixture was refluxed for an additional 2-hour period. Hydrolysis was then effected by pouring the reaction mixture over ice and acidifying with 20 milliliters of 96 percent sulfuric acid. The ether layer was separated, the aqueous layer was extracted with additional ether, and the ether layer and ether extracts were combined and dried over magnesium sulfate. The combined ether solutions gave a negative peroxide test with potassium iodide in glacial acetic acid. The ether was removed by distillation through a Vigreux column, and the residue was thereafter distilled through the same column under vacuum with nitrogen bubbler. The results were as follows:

| Fraction | B. P., °C. | Pressure, mm. | Weight, g. | $n_D^{20}$ |
| --- | --- | --- | --- | --- |
| 1 | 65-71 | 13-20 | 1.46 | 1.4247 |
| 2 | 71-83 | 13-14 | 2.90 | 1.4263 |
| 3 | [1] 81-86 | 12 | 5.48 | 1.4296 |
| 4 | 92-101 | 13 | 1.57 | 1.4313 |
| 5 | 97-101 | 9.5-5.5 | 1.51 | 1.4331 |
| Residue | | | 1.5 | |

[1] Major portion boiled from 85 to 86° C.

Fractions 1 and 2 were identified as 3-octanol (boiling point 76° C. at 16 mm. Hg; $n_D^{20}$ 1.4252), produced from 2-octene in the starting material in a 22.3 percent yield based on total octenes.

Fractions 3 to 5 were identified as 3-nonanol (boiling point 94° C. at 13 mm. Hg; $n_D^{20}$ 1.4308), obtained from 1-octene in the starting material, and representing a 39.6 percent yield based on total octenes.

*Example III*

The ozonide of 1-octene was added to phenylmagnesium bromide, and on hydrolysis of the reaction product, 1-phenyl-1-heptanol and its dehydration product, 1-phenyl-1-heptene, were obtained.

A solution of 0.15 gram-mole of octenes containing 92 percent 1-octene and 8 percent 2-octene in 400 milliliters of methylene chloride was ozonized, and the methylene chloride was thereafter removed under vacuum and replaced with 100 milliliters of diethyl ether.

Phenylmagnesium bromide was prepared by adding 0.32 gram-mole of phenyl bromide dropwise to 0.30 gram-atom of magnesium turnings in 225 milliliters of diethyl ether over a 2.25-hour period and thereafter refluxing for an additional 2-hour period.

The ozonide solution was added dropwise to the Grignard reagent at reflux temperature. When 40 milliliters remained to be added, the black color of the Grignard solution had been completely discharged, leaving a clear, light yellow-green solution. Addition of the remaining ozonide solution caused the reaction mixture to become black again. The addition was completed in 20 minutes, and the reaction mixture was refluxed an additional 2-hour period. The completed reaction mixture was poured over ice and acidified with sulfuric acid. The ether layer was withdrawn, the aqueous layer was extracted with additional ether, and the ether layer and ether extracts were combined and dried over magnesium sulfate. The ether was distilled off, and the residue was fractionally distilled from a 100-milliliter Claisen flask. The results were as follows:

| Fraction | B. P., °C. | Pressure | Weight, g. |
| --- | --- | --- | --- |
| 1 | 35-50 | 1 atm | 60.0 |
| 2 | 50-78 | 1 atm | 0.86 |
| 3 | 78-100 | 1 atm | 1.36 |
| 4 | to 172 | 4.5 mm | 33.16 |
| Residue | | | 2.6 |

Fraction 4 was redistilled, and the following products were obtained in the yields shown:

| Product | Yield (on octene) | | C | H | $MR_D$ |
| --- | --- | --- | --- | --- | --- |
| | *Percent* | | *Percent* | *Percent* | |
| 1-phenyl-1-heptene, B. P. 117-119° C. (11 mm). | 24 | Calc | 89.6 | 10.4 | 58.16 |
| | | Found | 89.7 | 10.3 | 59.4 |
| 1-phenyl-1-heptanol, B. P. 137-142 (11). | 14.6 | Calc | 81.2 | 10.5 | 60.2 |
| | | Found | 81.4 | 9.1 | 60.8 |
| 1-phenyl-1-hexanol, B. P. 131-134 (11). | 6.8 | Calc | 80.85 | 10.18 | 55.54 |
| | | Found | 80.85 | 10.38 | 56.43 |

*Example IV*

Styrene ozonide was added to ethylmagnesium bromide, and on hydrolysis of the reaction product, phenylethylcarbinol, propionaldehyde, and benzoic acid were obtained.

Styrene ozonide was prepared by ozonizing 0.15 gram-mole of styrene (stabilized with p-tertiary butyl catechol) in 400 milliliters of methylene chloride at 0° C. The methylene chloride was thereafter removed under vacuum and replaced with 100 milliliters of diethyl ether.

Ethylmagnesium bromide was prepared by adding 0.36 gram-mole of ethyl bromide dropwise to 0.34 gram-atom of magnesium turnings in 200 milliliters of diethyl ether over a 95-minute period and thereafter refluxing for 2 hours.

The ozonide solution was added dropwise to the Grignard reagent over a 3-hour period as fast as cooling with refluxing ether would permit, and the reaction mixture was thereafter refluxed 2 additional hours. The completed reaction mixture was poured over crushed ice and acidified with sulfuric acid. The ether layer was separated, The aqueous layer was saturated with sodium chloride and shaken with three 200-milliliter portions of diethyl ether. The ether layer and extracts were combined, dried over magnesium sulfate, and distilled from a Claisen flask. The results were as follows:

| Fraction | B. P., °C. | Pressure | Weight, g. | $n_D^{20}$ | $d_4^{20}$ |
|---|---|---|---|---|---|
| 1 | 34–50 | 1 atm | 28.6 | 1.3550 | |
| 2 | 50–65 | 1 atm | 1.0 | 1.3691 | |
| 3 | 65–76 | 1 atm | 1.2 | 1.3758 | |
| 4 | 31–67 | {14 mm, 29 mm} | 0.84 | 1.4973 | |
| 5 | 67–97 | 22 mm | 1.91 | 1.5183 | |
| 6 | 97–108 | 23 mm | 2.34 | 1.5236 | 1.011 |
| 7 | 108–112 | 22 mm | 2.53 | 1.5233 | |
| 8 | 112–115 | 22 mm | 2.05 | 1.5230 | 1.016 |
| 9 | 115–120 | 24 mm | 2.84 | 1.5241 | |
| 10 | 120–130 | 24 mm | 0.46 | 1.5254 | |

Fraction 1 gave a negative Schiff's test for aldehyde, but fractions 2 and 3 gave positive tests. Fraction 2 appeared to be propionaldehyde, which boils at 49° C.; the 2,4-dinitrophenylhydrazones of fraction 2 melted at 145.5–147.5° C. (literature for propionaldehyde 154° C.) and contained 23.99% N (theo. 23.55%).

From the residue (about 15 milliliters) benzoic acid was isolated by precipitation from ethyl alcohol with water and by decolorizing with charcoal. Neutral equivalent: theo. 122.1, found 123.2.

Fractions 4 through 10 were combined and redistilled at reduced pressure through a Podbielniak column. The following fractions were obtained:

| Fraction | B. P., °C. | Pressure, mm. | Weight, g. | $n_D^{20}$ | $d_4^{20}$ |
|---|---|---|---|---|---|
| 101 | 70.5–100.5 | 21½ | 0.49 | 1.5144 | |
| 102 | 100.5–106 | 21½ | 1.14 | 1.5208 | |
| 103 | 106–108.2 | 21½ | 3.20 | 1.5219 | 1.010 |
| 104 | 105–107.5 | 20½ | 1.06 | 1.5215 | |
| 105 | 107.5–110.5 | 20½ | 1.31 | 1.5219 | |
| 106 | 110.5–121 | 20½ | 1.13 | 1.5261 | |

The distillation was stopped at this point to remove benzoic acid from the column and distilling flask by washing with sodium carbonate, 0.24 gram being recovered as the acid, melting at 119–122° C. The distillation was then resumed without the column, and the following results were obtained:

| Fraction | B. P., °C. | Pressure, mm. | Weight, g. | $n_D^{20}$ |
|---|---|---|---|---|
| 107 | 114½–124 | 3 | 0.18 | 1.5314 |
| 108 | 124–139 | 3 | 1.00 | 1.5376 |
| 109 | 139–155 | 3 | 0.97 | 1.5424 |
| Residue | | | 0.56 | |

Fractions 102–105 were identified as phenylethylcarbinol (literature: boiling point 106–108° C. at 18 mm. Hg; $n_D^{20}$ 1.5200, $d_4^2$ 0.994), representing a 33 percent yield based on styrene.

Fraction 103 was acid to litmus, and therefore probably contained benzoic acid, which would be expected to increase the density thereof. Fraction 103 had a molar refraction of 41.12 (calculated for phenylethylcarbinol, 41.69).

*Example V*

Th ozonide of 2-ethyl-1-hexene was added to ethylmagnesium bromide, and on hydrolysis of the reaction product, diethylbutylcarbinol was obtained.

A solution of 0.10 gram-mole of 2-ethyl-1-hexene in 160 milliliters of methylene chloride was ozonized, and the methylene chloride was thereafter removed under vacuum and replaced with 100 milliliters of diethyl ether.

Ethylmagnesium bromide was prepared by adding 0.38 gram-mole of ethyl bromide dropwise to 0.35 gram-atom of magnesium turnings in 150 milliliters of diethyl ether and subsequently refluxing the mixture for 3.5 hours.

The ozonized solution was added dropwise to the Grignard reagent over a one-hour period, and the reaction mixture was thereafter refluxed for an additional two-hour period. Hydrolysis was then effected by pouring the reaction mixture on ice and acidifying with 10 milliliters of 96 percent sulfuric acid. The ether layer was separated, the aqueous layer was extracted with additional ether, and the ether layer and ether extracts were combined, washed with 36 grams of aqueous 30 percent potassium carbonate solution, and dried over anhydrous magnesium sulfate. The ether was distilled off and the residue was fractionally distilled through a small Podbielniak-type column. The results were as follows:

| Fraction | B. P., °C. | Pressure, mm. | Weight, g. | $n_D^{20}$ |
|---|---|---|---|---|
| 1 | Up to 80 | 105 | 1.581 | 1.3974 |
| 2 | 80–91 | 105 | 0.440 | 1.4150 |
| 3 | 91–96 | 105 | 0.361 | 1.4186 |
| 4 | 107–112½ | 105 | 2.347 | 1.4311 |
| 5 | 112½–113 | 105 | 3.068 | 1.4347 |
| 6 | Indefinite [1] | 105 | 1.217 | 1.4350 |
| 7 | ca. 112 [1] | 103–103.5 | 0.587 | 1.4340 |
| 8 | 116–122 | 102.5 | 0.341 | 1.4342 |
| 9 | 122–138 [2] | 103 | 0.382 | 1.4382 |
| 10 | 138–140 [2] | 102.5 | 0.250 | 1.4422 |
| Residue | | | 1.503 | |

[1] Thermometer bulb not completely wet.
[2] May be high, since infrared lamp was used on column to complete distillation.

Fraction 5 had a density ($d_4^{20}$) of 0.843, and a molar refraction, assuming it to be diethylbutylcarbinol, of 44.63, compared with a calculated value of 45.29. The best values reported in the literature are as follows: boiling point 116–118° C., at 105 mm. Hg, $n_D^{20}$ 1.4377, $d_4^{20}$ 0.8439, and observed molar refraction 44.85. Thus it appears that the principal product was diethylbutylcarbinol, obtained in 55.1 percent yield (based on olefin employed) in fractions 4 to 9.

It is to be understood that the foregoing examples are intended only to illustrate our invention, and in no sense to limit the invention to the specific charging stocks, process material, reaction conditions, or manipulative techniques employed therein. Our invention can be practiced broadly within the description thereof set forth hereinabove, and it is to be understood that any modifications or equivalents that would occur to one skilled in the art are to be considered as lying within the scope of our invention.

Our invention is broadly useful for the conversion of organic compounds containing an olefinic double bond into organic oxygenated compounds, including alcohols and particularly secondary alcohols, many of which have heretofore been prepared only by comparatively difficult techniques and in low yields.

In accordance with the foregoing description, we claim as our invention:

1. A process for preparing organic oxygenated compounds which comprises commingling an olefin ozonide with a Grignard reagent under liquid-phase conditions, subjecting the resulting mixture to a temperature sufficiently high to effect reaction therebetween, hydrolyzing the resulting reaction product, and recovering organic oxygenated compounds therefrom.

2. A process for preparing a secondary alcohol which comprises commingling an ozonide of an olefin having at least three carbon atoms in the molecule with a Grignard reagent, subjecting the resulting mixture to a temperature sufficiently high to effect reaction between said ozonide and said Grignard reagent, hydrolyzing the resulting reaction product, and recovering a secondary alcohol therefrom.

3. A process for preparing alcohols which comprises commingling an olefin ozonide with a Grignard reagent at a temperature between about 0 and 60° C., hydrolyzing the resulting reaction product, and recovering an alcohol therefrom.

4. A process for preparing alcohols which comprises commingling an olefin ozonide with a Grignard reagent, RMgX, where R is a hydrocarbon radical and X is a halogen atom, at a temperature between about 0 and 60° C., hydrolyzing the resulting reaction product, and recovering an alcohol therefrom.

5. A process for preparing alcohols which comprises commingling an aliphatic olefin ozonide with a Grignard reagent, RMgX, where R is a hydrocarbon radical and X is a halogen atom, at a temperature between about 0 and 60° C., hydrolyzing the resulting reaction product, and recovering an alcohol therefrom.

6. A process for preparing 3-pentadecanol which comprises commingling 1-tetradecene ozonide with ethylmagnesium bromide at ordinary temperatures, hydrolyzing the resulting reaction product, and recovering 3-pentadecanol therefrom.

7. A process for preparing 3-octanol which comprises commingling 2-octene ozonide with ethylmagnesium bromide at ordinary temperatures, hydrolyzing the resulting reaction product, and recovering 3-octanol therefrom.

8. A process for preparing 3-nonanol which comprises commingling 1-octene ozonide with ethylmagnesium bromide at ordinary temperatures, hydrolyzing the resulting reaction product, and recovering 3-nonanol therefrom.

9. A process for preparing 1-phenyl-1-heptanol which comprises commingling 1-octene ozonide with phenylmagnesium bromide at ordinary temperatures, hydrolyzing the resulting reaction product, and recovering 1-phenyl-1-heptanol therefrom.

10. A process for preparing phenylethylcarbinol which comprises commingling styrene ozonide with ethylmagnesium bromide at ordinary temperatures, hydrolyzing the resulting reaction product, and recovering phenylethylcarbinol therefrom.

JOSEPH W. SPARKS.
JAMES O. KNOBLOCH.

References Cited in the file of this patent

Golumbic et al., Journal American Chemistry Society, vol. 61 (1939), pages 996–1000 (5 pages), page 999 only is relied on.

Fieser and Fieser, Organic Chemistry (1944), pages 120–1 (2 pages), Pub. D. C. Heath and Co., Boston.